US008077688B2

(12) United States Patent
Zhang

(10) Patent No.: US 8,077,688 B2
(45) Date of Patent: *Dec. 13, 2011

(54) METHOD OF USER ACCESS AUTHORIZATION IN WIRELESS LOCAL AREA NETWORK

(75) Inventor: Wenlin Zhang, Guangdong Province (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 12/389,030

(22) Filed: Feb. 19, 2009

(65) Prior Publication Data

US 2009/0158442 A1 Jun. 18, 2009

Related U.S. Application Data

(63) Continuation of application No. 11/260,865, filed on Oct. 27, 2005, now Pat. No. 7,519,036.

(51) Int. Cl.
*H04W 4/00* (2009.01)
(52) U.S. Cl. ............. 370/338; 370/230; 726/4; 713/155
(58) Field of Classification Search .................. 370/328, 370/338, 229–235, 252; 726/2, 4, 5, 7, 17, 726/27–30; 713/155, 161, 168–170
See application file for complete search history.

(56) References Cited

U.S. PATENT DOCUMENTS

| 6,430,741 | B1 | 8/2002 | Mattson et al. |
| 6,442,588 | B1 | 8/2002 | Clark et al. |
| 6,594,483 | B2 | 7/2003 | Nykanen et al. |
| 6,957,067 | B1 | 10/2005 | Iyer et al. |
| 7,120,129 | B2 | 10/2006 | Ayyagari et al. |
| 7,136,912 | B2 | 11/2006 | Hotti |
| 7,310,307 | B1 * | 12/2007 | Das et al. ........................ 370/229 |
| 7,430,667 | B2 * | 9/2008 | Charbonneau et al. ........ 713/186 |
| 2001/0027527 | A1 * | 10/2001 | Khidekel et al. ............... 713/201 |
| 2001/0043577 | A1 | 11/2001 | Barany et al. |
| 2002/0037708 | A1 | 3/2002 | McCann et al. |
| 2003/0166397 | A1 | 9/2003 | Aura |

(Continued)

FOREIGN PATENT DOCUMENTS

CN 1453953 A 11/2003

(Continued)

OTHER PUBLICATIONS

Japanese Office Action, JP 2006-508099, 4 pages, Jun. 10, 2008.

(Continued)

*Primary Examiner* — Ricky Ngo
*Assistant Examiner* — Kan Yuen

(57) ABSTRACT

The present invention discloses a method of user access authorization in wireless local area networks. The method comprises: when a Wireless Local Area Network (WLAN) user terminal is accessing a WLAN operational network, the WLAN operational network, while authenticating this WLAN user terminal, judging whether to allow this WLAN user terminal to access according to authorization conditions having an impact on the access of this WLAN user terminal, if yes, the WLAN operational network will determine the access rules of this WLAN user terminal according to the said authorization conditions; otherwise, the WLAN operational network will notify the WLAN user terminal about the failure. Different users can be controlled to access the network according to different authorization conditions, and be restricted by different access rules after getting accessed. Thus, the access control capability of a wireless local area network is enhanced and the working efficiency of the network is improved.

27 Claims, 3 Drawing Sheets

U.S. PATENT DOCUMENTS

| | | | |
|---|---|---|---|
| 2004/0008672 A1 | 1/2004 | Kobylarz et al. | |
| 2004/0010713 A1* | 1/2004 | Vollbrecht et al. | 713/201 |
| 2004/0024764 A1* | 2/2004 | Hsu et al. | 707/9 |
| 2004/0066769 A1 | 4/2004 | Ahmavaara et al. | |
| 2004/0076128 A1 | 4/2004 | Rao et al. | |
| 2004/0156340 A1* | 8/2004 | Madour | 370/335 |
| 2004/0156372 A1* | 8/2004 | Hussa | 370/401 |
| 2004/0246933 A1 | 12/2004 | Valko et al. | |
| 2007/0014270 A1 | 1/2007 | Unruh | |
| 2007/0220596 A1* | 9/2007 | Keeler et al. | 726/7 |
| 2008/0184353 A1* | 7/2008 | Carroll et al. | 726/7 |
| 2010/0208743 A1* | 8/2010 | Short et al. | 370/401 |

FOREIGN PATENT DOCUMENTS

| | | |
|---|---|---|
| CN | 1474535 A | 2/2004 |
| JP | 2001-274845 A | 10/2001 |
| JP | 2002-152276 | 5/2002 |
| JP | 2002-157181 A | 5/2002 |
| KR | 2001-0090038 | 10/2001 |
| WO | WO 02/11467 A2 | 2/2002 |
| WO | WO 02/082730 A1 | 10/2002 |
| WO | WO 03/038670 A1 | 5/2003 |
| WO | WO 2004/077754 A1 | 9/2004 |

OTHER PUBLICATIONS

Ala-Laurila, Juha et al., "Wireless LAN Access Network Architecture for Mobile Operators," IEEE Communications Magazine IEEE USA, vol. 39, No. 11, pp. 82-89, Nov. 2001.

Buddhikot, M. et al., "Integration of 802.11 and Third-Generation Wireless Data Networks," IEEE, pp. 503-512, 2003.

Jajodia, Sushil et al., "A Unified Framework for Enforcing Multiple Access Control Policies," ACM, pp. 474-485, 1997.

Zhang, Junbiao et al., "Virtual Operator Based AAA in Wireless LAN Hot Spots With Ad-Hoc Networking Support," Mobile Computing Communications Review, vol. 6, No. 3, pp. 10-21, Jul. 2002.

Office action issued in corresponding Chinese patent application No. 03140977.6, dated Apr. 22, 2005, and Partial English translation thereof, total 6 pages.

Hao Zheng et al: "Solution of ZTE WLAN", dated Dec. 2002, and English translation thereof, total 8 pages.

Office action issued in corresponding European patent application No. EP04738215.5, dated Oct. 26, 2006, total 5 pages.

Office action issued in corresponding European patent application No. EP04738215.5, dated Apr. 29, 2008, total 5 pages.

Office action issued in corresponding European patent application No. EP04738215.5, dated Jan. 27, 2010, total 5 pages.

Office action issued in corresponding Japanese patent application No. JP2006-508099, dated Mar. 17, 2009, and English translation thereof, total 5 pages.

Decision of refusal issued in corresponding Japanese patent application No. JP2006-508099, dated Dec. 8, 2009, and English translation thereof, total 4 pages.

LAN/MAN Standards Committee of the IEEE Computer Society: "Part 11: Wireless LAN Medium Access Control (MAC) and Physical Layer (PHY) specifications,Amendment 4: Further Higher Data Rate Extension in the 2.4 GHz Band",IEEE Standard 802.11g,dated Jun. 27, 2003,total 78 pages.

LAN/MAN Standards Committee of the IEEE Computer Society: "Part 11: Wireless LAN Medium Access Control (MAC) and Physical Layer (PHY) specifications High-speed Physical Layer in the 5 GHz Band",IEEE Std 802.11a-1999,total 91 pages.

LAN/MAN Standards Committee of the IEEE Computer Society: "Part 11: Wireless LAN Medium Access Control (MAC) and Physical Layer (PHY) specifications:Higher-Speed Physical Layer Extension in the 2.4 GHz Band",IEEE Std 802.11b-1999,total 96 pages.

Draft 3GPP TS 23.234 V1.6.0: "3rd Generation Partnership Project;Technical Specification Group Services and System Aspects;3GPP system to Wireless Local Area Network (WLAN) Interworking;System Description(Release 6)", dated Feb. 2003,total 65 pages.

Office action issued in corresponding Russian patent application No. RU2005134506, dated Jan. 29, 2007, and English translation thereof, total 5 pages.

* cited by examiner

METHOD OF USER ACCESS AUTHORIZATION IN WIRELESS LOCAL AREA NETWORK

CROSS-REFERENCES TO RELATED APPLICATIONS

This application is a continuation of U.S. patent application Ser. No. 11/260,865 filed on Oct. 27, 2005, which is a continuation of International Application Ser. No. PCT/CN2004/000614 filed on Jun. 7, 2004, which claims the priority benefit of Chinese Patent Application Ser. No. 03140977.6 filed on Jun. 6, 2003. The disclosures of the above applications are incorporated herein by reference.

FIELD OF THE INVENTION

The present invention relates to authentication and authorization techniques in network, more particularly to a method for access authorization of a user in the operational network of Wireless Local Area Network (WLAN).

BACKGROUND OF THE INVENTION

With users' higher and higher requirements for wireless access rate, Wireless Local Area Network (WLAN) emerges as the times require, which can provide high-rate wireless data access in a small area. WLAN incorporates various techniques, among which a widely applied technical standard is IEEE 802.11b, which adopts 2.4 GHz frequency band and the highest data transmission rate thereof can be as high as 11 Mbps. IEEE 802.11g and Bluetooth technology also adopt this frequency band and the highest data transmission rate of 802.11g can be as high as 54 Mbps. Other new standards like IEEE 802.11a and ETSI BRAN Hiperlan2 adopt 5 GHz frequency band, and the highest transmission rate can also be as high as 54 Mbps.

Although there are various wireless access techniques, most WLAN are used to transmit Internet Protocol (IP) data packet. As for a wireless IP network, the specific WLAN access technique adopted is transparent to upper hierarchy IP. Users access a wireless IP network through Access Points (AP), and the network control and connection devices are connected to constitute an IP transmission network.

With the rising and development of WLAN technology, intercommunication between WLAN and various wireless mobile communication networks becomes the current research focus, wherein the wireless mobile communication network can be Global System for Mobile communications (GSM), Code Division Multiple Access (CDMA) system, Wideband Code Division Multiple Access (WCDMA) system, Time Division-Synchronous Code Division Multiple Access (TO-SCDMA) system and CDMA2000 system. With the Third Generation Partnership Project (3GPP) standards, a user terminal can be connected to the Internet or Intranet through WLAN access network, or be connected to home network of 3GPP system or visited network of 3GPP system through WLAN access network. Specifically speaking, when getting accessed locally, a WLAN user terminal is connected to 3GPP home network through a WLAN access network; when roaming, the WLAN user terminal is connected to 3GPP visited network through a WLAN access network. Some of the entities in 3GPP visited network are interconnected with corresponding entities which have the same functions in 3GPP home network, for instance, 3GPP Authentication Authorization and Accounting (AAA) Proxy in 3GPP visited network and 3GPP Authentication Authorization and Accounting (AAA) Server in 3GPP home network; WLAN Access Gateway (WAG) in 3GPP visited network and Packet Data Gateway (PDG) in 3GPP home network, and so on, as shown in FIG. 1.

As shown in FIG. 1, 3GPP system is mainly composed of Home Subscriber Server (HSS)/Home Location Register (HLR), 3GPP AAA Server, 3GPP AAA Proxy, WAG, Packet Data Gateway, Offline Charging System and Online Charging System (OCS). WLAN user terminal (WLAN UE), WLAN access network and all entities of 3GPP system constitute a 3GPP-WLAN interworking network, and this 3GPP-WLAN interworking network can be taken as a WLAN service system. 3GPP AAA Server takes charge of authentication, authorization and accounting of the user, as well as collecting the charging information transmitted by WLAN access network and transmitting the collected information to charging system. Packet Data Gateway takes charge of transmitting user data from WLAN access network to 3GPP network or to other packet networks. Charging system mainly receives and records the user's charging information transmitted from the network. OCS system guides the network to transmit online charging information periodically according to the expenses of an online charged user, and makes appropriate statistics and control operations.

In normal conditions, when a WLAN user terminal desires to access a 3GPP-WLAN network, this user terminal will send an access request to corresponding access authentication unit in 3GPP-WLAN network through WLAN access network; the access authentication unit, which is usually a 3GPP AAA Server, authenticates the request after receiving it. If the request passes the authentication, all ports will simply be opened to this user terminal. However, the structure of an operational WLAN is much more complicated than the simplified network structure shown in FIG. 1. Here, said operational WLAN refers to a WLAN that can be operated and managed, which will not only perform authentication, authorization and accounting of a user, but also provide one or more than one kind of network access and network-based service, for example, various local area network (LAN) services like LAN inside local hotels or airports and LAN games, as well as access to a LAN that can provide different services, Internet access and services based on 3GPP packet network.

Because an operational WLAN can access to different LANs at the same time and the operational rules are comparatively complicated, different access rules may be set according to the users account and accessing time. Therefore, the traditional method of access authorization based only on the authentication result is incontrollable and inconvenient for operation.

BRIEF SUMMARY OF THE INVENTION

Therefore, the main object of the present invention is to provide a method of user access authorization in WLAN, with which different user terminals can be controlled to access WLAN under different restrictive conditions, thereby access control capability of WLAN can be enhanced, and operational efficiency of the network can be improved.

To obtain the above object, the technical scheme of the present invention is as follows:

A method of user access authorization in wireless local area network, comprising:

When a Wireless Local Area Network (WLAN) user terminal is accessing to a WLAN operational network, while authenticating this WLAN user terminal, the WLAN operational network judging whether this WLAN user terminal is allowed to access according to the authorization conditions having an impact on the access of this WLAN user terminal, if allowed, determining the access rules of this WLAN user terminal according to said authorization conditions; otherwise, notifying the WLAN user terminal about the failure.

The method further comprises: sending the determined access rules to one or more than one related entity implementing access rules so as to implement the restriction on the access of the user terminal.

In the foregoing scheme, the process of authentication and authorization of a WLAN user terminal is: after a WLAN user terminal sends an access request to the WLAN operational network, the WLAN operational network performs legality authentication of the current WLAN user terminal getting accessed, if the WLAN user terminal passes the authentication, the WLAN operational network continues to judge whether this WLAN user terminal is allowed to access according to the authorization conditions; otherwise, the WLAN operational network transmits access failure information to this WLAN user terminal.

The said authorization conditions having an impact on the access of the WLAN user terminal comprise: conditions of user account, user subscription information, operational rules, or any combination of the former three. The said user subscription information comprises a designation list of network services that the user can access. The said access rules are determined by the AAA server in the WLAN operational network.

Said access rules are restrictive conditions used for determining access area or path of the current user terminal, or restrictive conditions used for determining the access time of the current user terminal, or null, namely there is no restrictive condition for the access of the user terminal.

The implementing entity of the said access rule is AAA, WLAN Access Gateway (WAG), Access Controller (AC), Access Point (AP) or a user terminal. If the implementing entity is a user terminal, the method further comprises: after the access rules are determined, the network transmits to the user terminal at the same time the access authentication and authorization success information of the current WLAN user terminal and the access rules which the user terminal needs to be informed of.

In the above scheme, said WLAN operational network is a 3GPP-WLAN interworking network, a 3GPP2-WLAN interworking network, or other operational WLANs with subscribed users.

It can be seen from the above scheme that, key of the present invention lies in: when a WLAN user terminal is accessing to a WLAN operational network, while authenticating this user terminal, the network judges whether this user terminal is allowed to access according to the authorization conditions of this user terminal, determines the corresponding access rules for this user terminal according to the authorization conditions, and then restricts the area, path, or time of access of the user in subsequent procedures or subsequent service applications according to the determined access rules.

Therefore, in the method provided by the present invention, the access control and user terminal comprises not only legality authentication, but also determination of other authorization conditions and the access rules customized according to the authorization conditions. Therefore, different WLAN user terminals will access the WLAN operational network according to different authorization conditions, and be restricted by different access rules after the access. Accordingly access authorization capability of WLAN is enhanced. In addition, when a WLAN user terminal requests the WLAN operational network for a service, the WLAN operational network will treat the user terminal according to the corresponding access rules, and provides services for the current accessing user terminal only in the restrictive area, path and time. Accordingly network operational capability and operation efficiency can be enhanced, and the network can provide network access of different areas, or different paths, or different time for the same user or different users, thereby facilitates access management and makes diversified services possible.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

The following description of the preferred embodiment(s) is merely exemplary in nature and is in no way intended to limit the invention, its application, or uses.

To make the object, technical scheme and advantages of the present invention clearer, the present invention will be described in detail hereinafter with reference to the accompanying drawings and specific embodiments.

Figure 1:
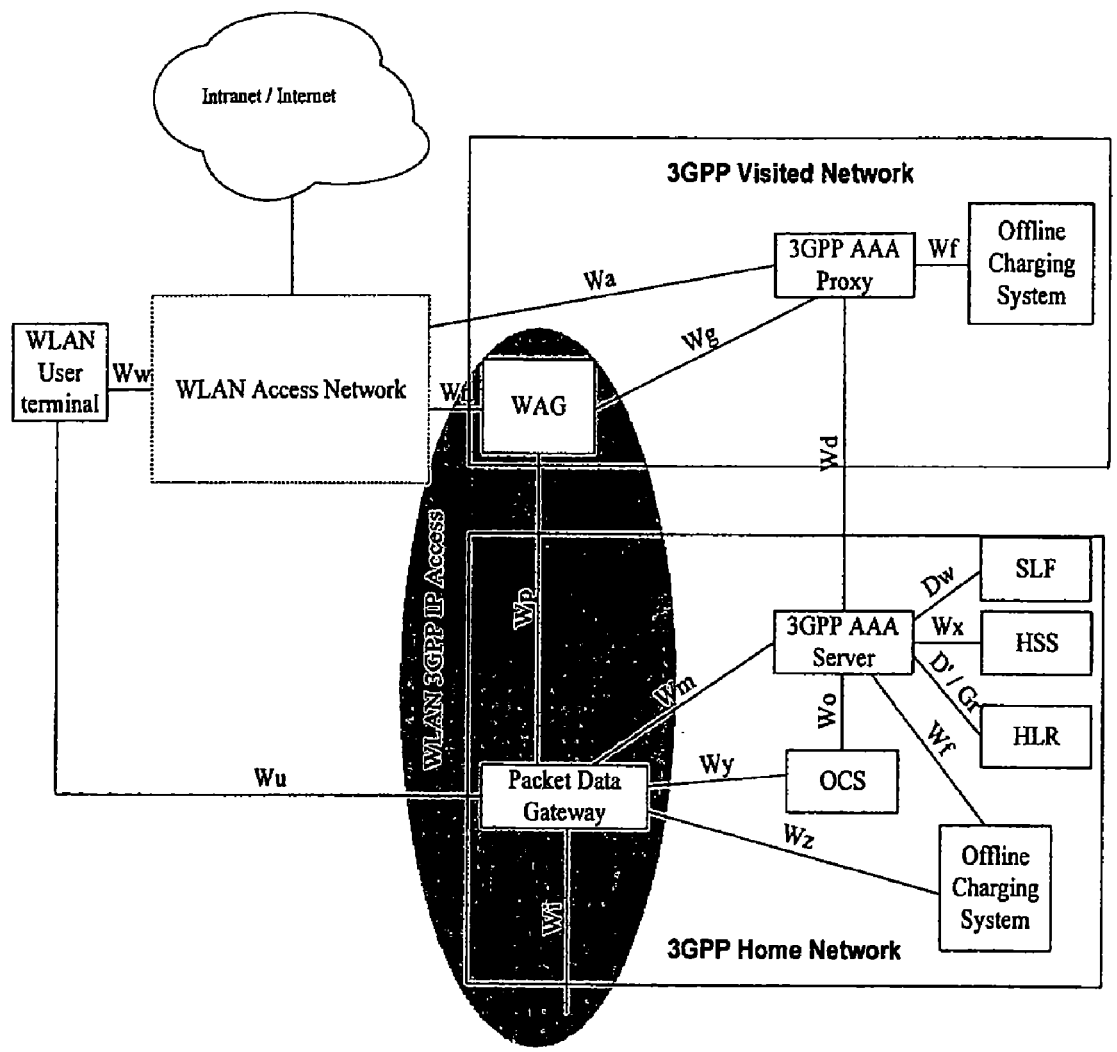
FIG. 1 is a schematic diagram illustrating network structure of inter-working WLAN and 3GPP system.
Figure 2:
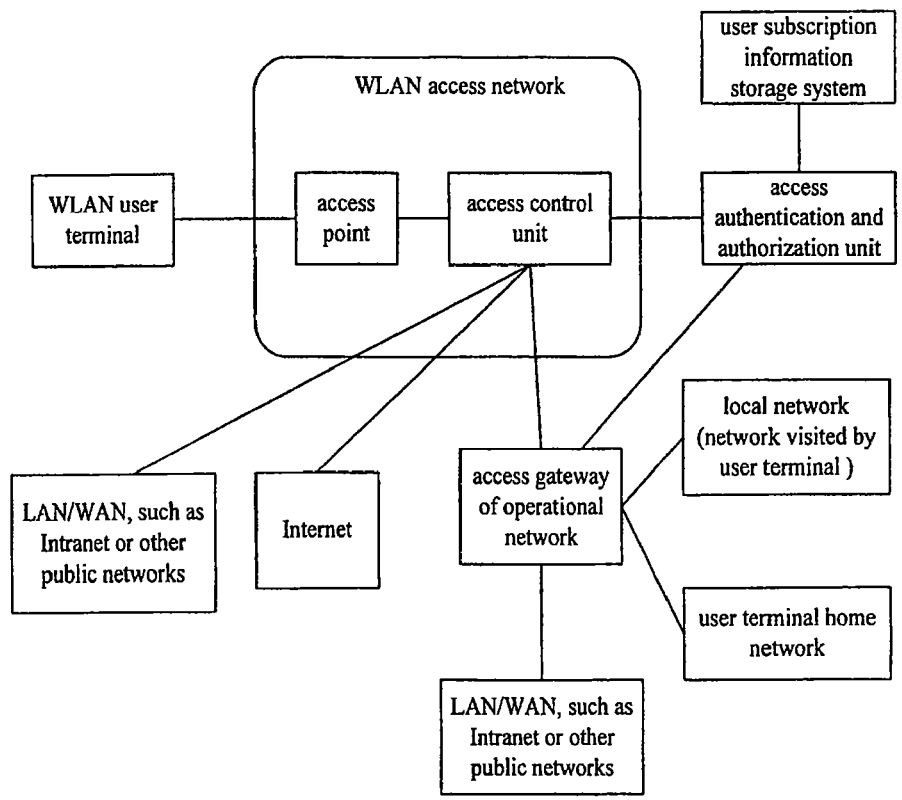
FIG. 2 is a schematic diagram illustrating a networking structure of WLAN operational network.

FIG. 2 is a schematic diagram illustrating a networking structure of WLAN operational network. As shown in FIG. 2, the WLAN in FIG. 2 is an operational WLAN, in which, the WLAN access network is not only directly connected to wide area networks, like Internet, other Intranets, and wide area private networks, but also connected, directly or through the access gateway of the operational network, to various networks, for example, local area networks inside local hotels or airports and mobile operational networks such as 3GPP PS domain. The said mobile operational networks can be wide area networks or local area networks. The access gateway of an operational network is connected at the same time to the home network and visited network of the current user terminal as well as to a WLAN access authentication and authorization unit, for example, 3GPP AAA Server.

For a WLAN user terminal desiring a certain service through the WLAN operational network, access to certain networks directly or through a gateway by this user terminal may have been restricted at the time of subscription based on the principle of diversified services. For instance, the user terminal may not be allowed to access the Intranet inside an airport connected with the WLAN access network, but can access the Internet, or the user terminal has to access the Internet and certain private networks through subscription; or this WLAN user terminal is dynamically restricted from accessing some special networks directly or through an access gateway during a certain period or in a certain area according to such conditions as account information of the user terminal, managing or operational rules of the operator. Therefore, when accessing a WLAN operational network, a user terminal should be restricted by access rules according to conditions having impact on authorization, and these access rules should be applied to relevant switching or routing gateways of the network, rather than being authorized to access only according to the authentication result.

In practical applications, said access authorization in the present invention does not refer to the service authorization associated to a mobile network. Said access authorization is used to determine whether a user terminal is allowed to access or under what condition can a user terminal access a certain network before the service authorization. As to whether the current accessing WLAN user terminal can use the relevant services, it is to be judged by subsequent service authorization procedures. Difference between access authorization and service authorization is herein described with an example: Suppose that a user terminal applies for Internet access while the current network can provide two kinds of Internet access, one is to directly access the Internet through the WLAN access network, the other is to access the Internet through the WLAN access network and then through WAG, then, if there is no access restriction on the current user terminal, the user terminal can arbitrarily select one of the two accessing modes, or leave it to the service authorization to determine which accessing mode to adopt; however, if restricted from directly accessing the Internet through WLAN access network, the current user terminal can access the Internet only through WAG, while whether this user terminal can be allowed of Internet services is to be determined by the service authorization.

Figure 3:
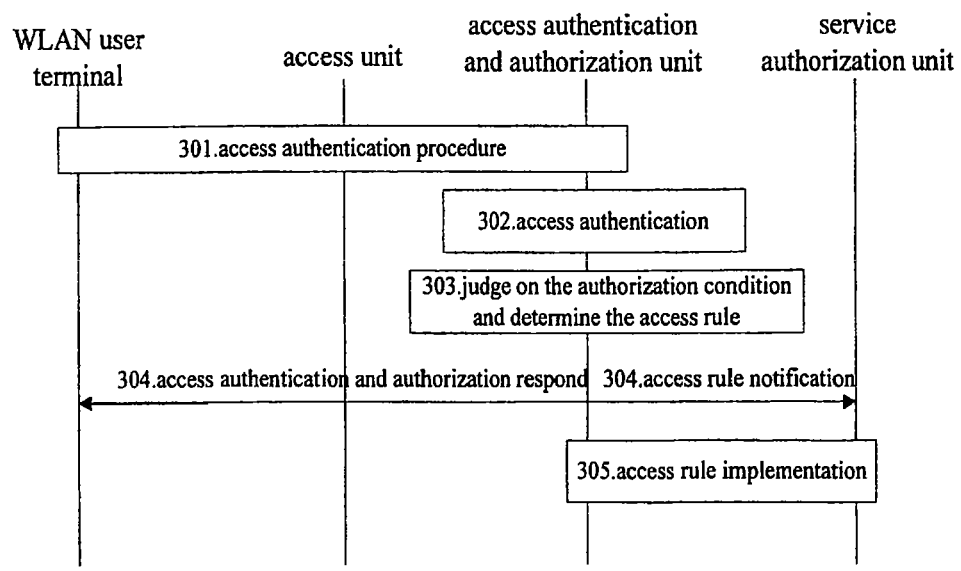
FIG. 3 is a flowchart illustrating the access authentication and authorization by WLAN operational network in accordance with the present invention.

The access authorization procedure for a user terminal in the present invention is shown in FIG. 3, which comprises the following steps:

Step 301-302: when a WLAN user terminal requests to access a network, the network performs access authentication for this user terminal. Specifically speaking, the access authentication and authorization unit in the network starts a legality authentication procedure between the user terminal and the network through the access control unit: the user terminal transmitting the required authentication information to the access authentication and authorization unit through the access control unit; after receiving the relevant information of the user terminal, the access authentication and authorization unit implementing access authentication by itself, if the authentication is successful, going to the next step, otherwise notifying the user terminal about the failure of the access authentication and then ending the current access authentication procedure. The access control unit here can be an Access Controller (AC) in a WLAN access network, a WLAN access gateway (WAG) or the combination of the former two; the access authentication and authorization unit can be a 3GPP AAA Server.

Step 303: after the access authentication of the user terminal is successful, the access authentication and authorization unit judges whether to allow this user terminal to access according to the authorization conditions of the current user terminal, if not allowed, notifying this user terminal about the failure of access authorization and then ending the current access authorization procedure; otherwise, determining the access rules of the current accessing user terminal according to the authorization conditions thereof, wherein the access rules indicate what restricting principles effect when the authorized user terminal is getting accessed. Said authorization conditions comprise: user account information, user subscription data, operational rules of operators, or any combination of the former three. Said access rules mainly refer to the restriction on the network scope or paths to be accessed, for instance: the accessible gateway and area connected with the network, the network equipment for access. The rules may also comprise restrictions on access time. The access authentication and authorization unit can directly set the access rule as null, which indicates there is no special restriction on the access of this user terminal.

The said user subscription data can be the designation list of accessible services the user has subscribed to, for instance, Internet, local game network, Starbuck chain network, IPv6-Internet, and so on.

Step 304: after determining the access rules, on one hand, the access authentication and authorization unit notifies the user terminal and access control unit about successful access authentication and authorization for the user terminal and stores the determined access rules; on the other hand, the access authentication and authorization unit notifies each related entity implementing access rules about the determined access rules, the related entity implementing access rules herein refers to one or more network entities that can perform these rules, such as the 3GPP-AAA, the service authorization unit, AC, AP, DHCP unit, the access gateway of the operational network, and so on. The access authentication and authorization unit may also notify the user terminal about all or part of the determined access rules; thereby the user terminal can know or assist in implementing said access rules. The notification about the access rules can be sent to the user terminal with the notification about the success of access authentication and authorization.

Step 305: The entity implementing access rules, such as the service authorization unit shown in FIG. 3, stores the rules after receiving them and performs access rules when the user terminal applies for a WLAN network service through this entity. For instance, according to the access rules, the service authorization unit can judge whether to allow a current user terminal to access a specified network area during this time period and determine where it should get accessed from. Generally, the service authorization unit and the access authorization unit are both in AAA.

Specific access rules can be implemented through the existing methods like filtering technique, IP allocation scheme, Virtual Local Area Network (VLAN), subnet division, Virtual Private Network (VPN), user layer-2 separation, and so on. For example, by means of VLAN technique or IP allocation, the access control unit can put the current user terminal applying for the service under a subnet complying with the access rules, or allocate an independent subnet address to the current user terminal applying for the service such that this user terminal can only access the subnet or the area specified by VLAN. When the access rules are implemented by the service authorization unit, if the user has requested for the relevant services, the service authorization unit will judge whether the requested services meet the requirement of the access rules corresponding to the current user terminal; if the request does not comply with the access rules, it will be rejected before the service authorization.

The access authorization in accordance with the present invention is performed when the user accesses a WLAN operational network, generally after the network finishes the identity legality authentication of the current accessing user terminal, as described in step 301-305. It is obvious that the access authorization may be performed before the authentication of the user, i.e. first judging on the authorization conditions of the current accessing user terminal and determining the access rules, and then executing the identity legality authentication, only that the process is relatively complicated. When the user terminal is being notified, authentication result and authorization result are usually carried in one notifying message, for example, EAP-success message of EAP protocol.

Authentication result and authorization result can also be informed separately, for example, informing the authentication result before informing the authorization result. Said WLAN operational network in the present invention comprises a 3GPP-WLAN interworking network, a 3GPP2-WLAN interworking network, or other operational WLAN networks with subscribed users.

Figure 4:
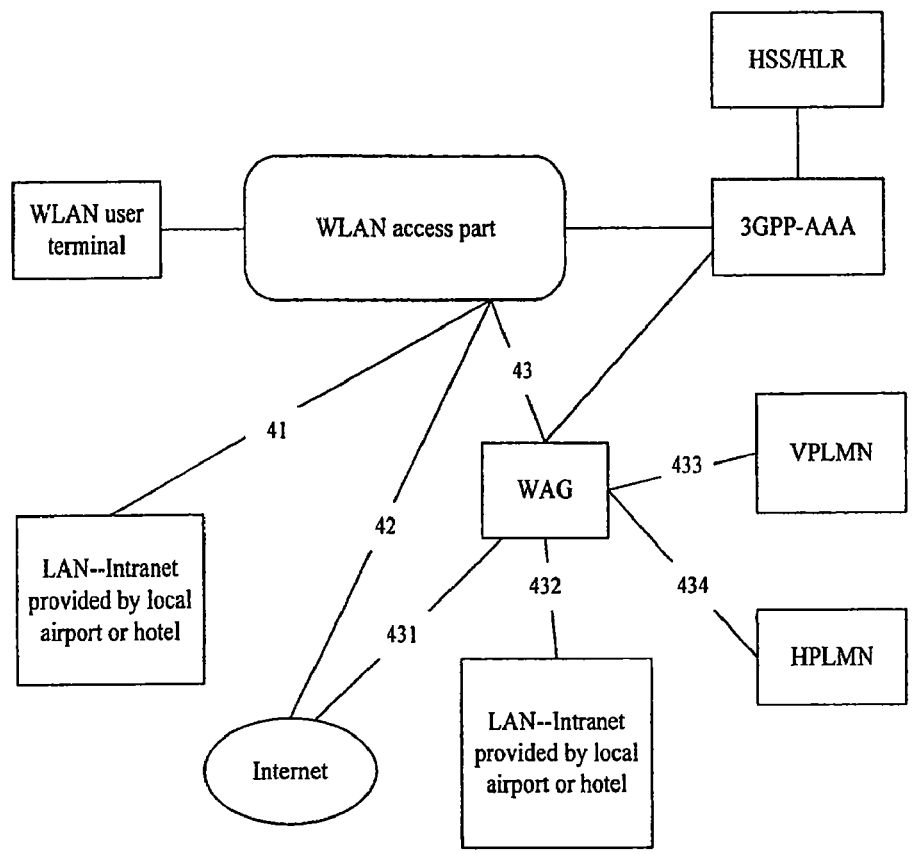
FIG. 4 is a schematic diagram illustrating the networking structure of WLAN operational network in an embodiment of the present invention.

FIG. 4 is a schematic diagram illustrating the networking structure of WLAN operational network in an embodiment of the present invention. As shown in FIG. 4, in this 3GPP-WLAN interworking operational network, 3GPP-AAA is the access authentication and authorization unit; the WLAN access part is mainly composed of AC and AP; and AC, WAG, or the combination of AC and WAG is the access control unit. Through the WLAN access part, the WLAN operational network can directly provide local area network service 41 and Internet access service 42 for WLAN user terminals in some hot spots like airport and hotels. Through the WLAN access part and WAG, the WLAN operational network can also provide 3GPP-specifc service 43 for WLAN user terminals by accessing to a 3GPP operational network. This WLAN operational network also includes HSS/HLR, which is used to store various information of the user terminal, such as the subscription information.

With reference to FIG. 4 again, the 3GPP-specific service 43 that a WLAN user terminal can obtain through the WLAN operational network comprises: Internet access service 431 provided by the 3GPP network operator through WAG, feature local area network service 432, and the mobile services based on the packet switched (PS) domain of a mobile network, such as various services of the Visited Public Land Mobile Network (VPLMN) 433 and those of HPLMN 434. Internet access service 431 can provide a bandwidth wider than that of direct Internet access in hot spots. In another word, when providing the same service, Internet access service 431 is much faster than Internet access service 42, but the former may be more expensive than the latter. Feature local area network service 432 mainly means that the private network of an operator can provide such internal interactive feature services as management or game for the user terminals. Said various mobile services 433 and 434 comprise at least such feature services of mobile network as IP Multimedia Subsystem (IMS) service, Short Message Service (SMS), Multimedia Message Service (MMS), and Location Service (LCS).

First Embodiment

Figure 5:
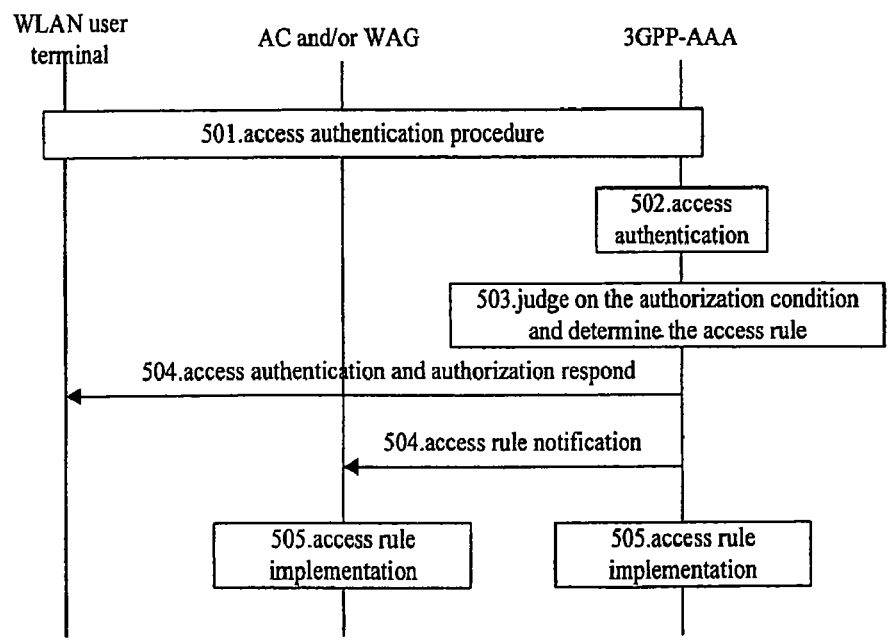
FIG. 5 is the flowchart of access authentication and authorization in the embodiment shown in FIG. 4.

Based on the networking structure shown in FIG. 4, assuming that user terminal A has only subscribed to local Internet service in a hot-spot area and there is only Internet service in the access authorization list of the user subscription information, then as shown in FIG. 5, the access authorization procedure for user terminal A is as follows:

Step 501-502: when requesting to access a 3GPP-WLAN network as shown in FIG. 4, user terminal A sends an access request and information required for authentication to 3GPP-AAA through AC; and then 3GPP-AAA authenticates the identity legality of user terminal A, if user terminal A passes the authentication, execute step 503 and continue to judge on the authorization conditions of user terminal A; otherwise, return the access authentication failure information to user terminal A, and end the procedure.

Step 503: 3GPP-AAA judges whether to allow user terminal A to access according to all the authorization conditions thereof, if it is not allowed, 3GPP-AAA returns the access authorization failure information to user terminal A, and ends the procedure; otherwise, 3GPP-AAA determines the access rules of user terminal A according to the authorization conditions thereof. Thus, according to the subscription data of user terminal A, the access rules of user terminal A are determined as "access only the local Internet of the hot-spot area".

Step 504: 3GPP-AAA notifies user terminal A of the success of access authentication and authorization as well as the access rules determined in step 503, and notifies the AC of the WLAN access network such that the AC could implement the access rules.

Step 505: AC stores the determined access rules after receiving it, when this user terminal applies for Internet services, according to the pre-stored access rules, AC learns this user terminal can only access local Internet in the hot-spot area, and judges whether the user terminal is currently located in the hot-spot area, if yes, get the user terminal directly accessed to local Internet through AC; otherwise, by means of VLAN technique or IP allocation, AC puts the user terminal in a subnet that can only be connected to local Internet in the hot-spot area or allocates an independent subnet address for user terminal A, wherein the subnet is only allowed to access local Internet. Accordingly user terminal A can only access local Internet.

Second Embodiment

Based on the networking structure as shown in. FIG. 4, assuming that user terminal B is only allowed to access the network through WAG and forbidden to get accessed locally in a hot-spot area. As shown in FIG. 5, the access authorization procedure of user terminal B is essentially the same as that of user terminal A in the first embodiment, except that the access rules of user terminal B is determined as "allowed to access through WAG, forbidden to get a local access in a hot-spot area" in step 503. In this way, in step 505, AC will control user terminal B to access WAG only and will not allow terminal B to connect with other networks. When user terminal B applies for Internet services, Internet access service 42 cannot be used by user terminal B while only Internet access service 431 is available, namely, user terminal B can only access a 3GPP operational network through WAG to enjoy the Internet access service provided by a 3GPP operational network.

Third Embodiment

Based on the networking structure as shown in FIG. 4, assuming that user terminal C is not allowed to access the Visited Public Land Mobile Network (VPLMN). As shown in FIG. 5, the access authorization procedure of user terminal C is essentially the same as that of user terminal A in the first embodiment, except that the access rules of user terminal C is determined as "not allowed to access the visited public land mobile network" in step 503. Based on the access rules, user terminal C has more access rights and can access various networks connected with the WLAN access network according to its service requests, except the visited public land mobile network. The access rules can be implemented in WAG so that the user can not access the visited public land mobile network, or directly implemented in 3GPP-AAA. For instance, when user terminal C requests for a relevant service, it will be judged according to the access rules of user terminal C whether the requested service conforms to the access rules thereof, if not, namely, user terminal C is currently located in a visited public land mobile network and is requesting for a service provided by this visited public land mobile network, reject this request before the service authorization; otherwise, continue with the service authorization.

The above description is just preferable embodiments of the present invention, and is not used to confine the protection scope of this invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of user access control to a wireless telecommunications network, comprising:
    an access authentication process including authenticating a wireless local area network (WLAN) user terminal upon receiving an access request for accessing a WLAN operational network from the WLAN user terminal; and
    an access authorization process comprising:
        verifying whether the WLAN user terminal is allowed to access the WLAN operational network, wherein whether the WLAN user terminal is allowed to access the WLAN operational network is verified according to authorization conditions; and
        determining access rules to be applied to the WLAN user terminal at least based on the authorization conditions, wherein the access rules are configured to restrict the access of the WLAN user terminal to access the WLAN operational network, and
    wherein the access authorization process occurs after the access authentication process succeeds, and if the access request complies with the access rules, the method further comprises:
        performing a service authorization, wherein the service authorization determines whether the WLAN user terminal is allowed to access a service.

2. The method according to claim 1, wherein the authorization conditions comprise one or more of the following: a user's account information, a user's subscriber information, managing rules of operators, and operational rules of operators.

3. The method according to claim 1, wherein the access rules include one or more of the following: access scope limitation, access time limitation, and access path.

4. The method according to claim 1, wherein the access rules are determined by an authentication, authorization and accounting (AAA) server in the WLAN operational network.

5. The method according to claim 4, wherein the determined access rules are implemented by one or more of the following network entities: the AAA server, a WLAN access gateway (WAG), a service authorization unit, the WLAN user terminal, an Access Point (AP), and an access controller (AC).

6. The method according to claim 1, wherein the access rules are implemented by using one or more of the following methods: an IP allocation scheme, a Virtual Local Area Network (VLAN) allocation, and filtering.

7. The method according to claim 1, further comprising:
    notifying the WLAN user terminal of the success of the access authentication and the access authorization in one message.

8. The method according to claim 7, further comprising:
    notifying the user terminal the determined access rules using the message.

9. The method according to claim 1, wherein the WLAN operational network comprises one of: a 3GPP-WLAN inter-working network, and a 3GPP2-WLAN inter-working network.

10. A system for user access control, the system comprising:
    a wireless local area network (WLAN) user terminal; and
    an authentication, authorization and accounting (AAA) server included in a WLAN operational network and in communication with the WLAN user terminal,
    wherein the WLAN user terminal is configured to send an access request for accessing the WLAN operational network to the AAA server,
    the AAA server is configured to:
        perform an access authentication process including authenticating eligibility of the WLAN user terminal upon receiving the access request, and
        perform an access authorization after the access authentication process is successful;
    wherein the access authorization includes:
        verifying whether the WLAN user terminal is allowed to access the WLAN operational network according to authorization conditions, and
        determining access rules to be applied to the WLAN user terminal at least based on the authorization conditions, wherein the determined access rules include an access limitation policy configured to restrict the access of the WLAN user terminal to access the WLAN operational network,
    and if the access request complies with the access rules, the AAA server is further configured to:
    perform a service authorization, wherein the service authorization determines whether the WLAN user terminal is allowed to access a service.

11. The network system of claim 10, wherein the AAA server is further configured to notify the WLAN user terminal of the success of the access authentication and the access authorization using a single message.

12. The network system of claim 11, wherein the AAA server is further configured to inform the WLAN user terminal of the determined access rules using the single message.

13. The network system of claim 10, wherein the AAA server is further configured to notify a network entity, capable of implementing the access rules, of the determined access rules in order to restrict the access of the WLAN user terminal in accordance with the access rules.

14. The network system of claim 13, wherein the network entity capable of implementing the access rules comprises one or more of the following: a WLAN access gateway (WAG), a service authorization unit, an Access Point (AP), and an access controller (AC).

15. The network system of claim 10, wherein the WLAN operational network comprises one of: a 3GPP-WLAN inter-working network, and a 3GPP2-WLAN inter-working network.

16. A wireless telecommunications network, comprising:
    an access authentication module, configured to authenticate a wireless local area network (WLAN) user terminal requesting an access to the network, in response to an access request for accessing the network from the user terminal;
    an access authorization module, configured to perform an access authorization of the WLAN user terminal after the access authentication module successfully authenticates the WLAN user terminal; and a service authorization module;

wherein the access authorization process comprises verifying whether the WLAN user terminal is allowed to access the network according to authorization conditions and determining access rules to be applied to the WLAN user terminal based on the authorization conditions, wherein the access rules are configured to allow the network to restrict the access of the user terminal to access the WLAN operational network, and wherein if the access request complies with the access rules, the service authorization module is configured to perform a service authorization process to determine whether the WLAN user terminal is allowed to access a service.

17. The wireless telecommunications network of claim 16, wherein the access authentication module and the access authorization module are included in an authentication, authorization and accounting (AAA) server.

18. The wireless telecommunications network according to claim 17, wherein the access rules to be applied to the WLAN user terminal are determined by the AAA server.

19. The wireless telecommunications network according to claim 18, wherein the AAA server is configured to inform the WLAN user terminal of success of the access authentication and access authorization in a single message.

20. The wireless telecommunications network according to claim 19, wherein the AAA server is further configured to notify the WLAN user terminal of the determined access rules.

21. The wireless telecommunications network according to claim 16, wherein the determined access rules are implemented in one or more of the following: a WLAN access gateway (WAG), a service authorization unit, an Access Point (AP), and an access controller (AC) within the network.

22. The wireless telecommunications network according to claim 16, wherein the wireless telecommunication network comprises one of: a 3GPP-WLAN inter-working network, and a 3GPP2-WLAN inter-working network.

23. An authentication, authorization and accounting (AAA) server, comprising:

a receiver, configured to receive an access request for accessing a wireless local area network (WLAN) operational network from a WLAN user terminal; and a processor, configured to:

authenticate the WLAN user terminal in response to the access request from the WLAN user terminal; and perform an access authorization process of the WLAN user terminal after the WLAN user terminal is authenticated successfully;

wherein the access authorization process comprises verifying whether the WLAN user terminal is allowed to access the WLAN operational network according to authorization conditions; and determining access rules to be applied to the WLAN user terminal based on the authorization conditions; wherein the access rules are configured to allow the WLAN operational network to restrict the access of the user terminal to access the WLAN operational network; and wherein if the access request complies with the access rules, the processor is further configured to:

perform a service authorization process to determine whether the WLAN user terminal is allowed to access a service.

24. The AAA server according to claim 23, wherein the authorization conditions comprise one or more of the following: a user's account information, a user's subscriber information, managing rules of operators, and operational rules of operators.

25. The AAA server according to claim 23, wherein the access rules comprises one or more of the following: access scope limitation, access time limitation, and access path.

26. The AAA server according to claim 23, wherein the AAA server is further configured to notify the WLAN user terminal of the determined access rules.

27. The AAA server according to claim 23, wherein the determined access rules are implemented in one or more of the following: a WLAN access gateway (WAG), a service authorization unit, an Access Point (AP), and an access controller (AC).

* * * * *